United States Patent [19]

Margolis et al.

[11] Patent Number: 4,701,333
[45] Date of Patent: Oct. 20, 1987

[54] PROCESS FOR EXTRACTING ROASTED AND GROUND COFFEE

[75] Inventors: Geoffrey Margolis, Bussigny; Alain Mercier, Jouxtens-Mezery; Klaus Schlecht, Orbe, all of Switzerland

[73] Assignee: Nestec S.A., Vevey, Switzerland

[21] Appl. No.: 297,324

[22] Filed: Aug. 28, 1981

[51] Int. Cl.$^4$ .................................................. A23F 5/26
[52] U.S. Cl. .................................... 426/432; 426/434
[58] Field of Search .............................. 426/432, 434

[56] References Cited

U.S. PATENT DOCUMENTS 2,783,149  2/1957  Epstein .................................. 426/432
3,995,067  11/1976  Marsh et al. ...................... 426/434 X

FOREIGN PATENT DOCUMENTS 1571156  7/1980  United Kingdom .

OTHER PUBLICATIONS

Sivetz et al., Coffee Processing Technology, vol. I, 1963, Avi: Westport, Conn., pp. 338, 519, 596.

Primary Examiner—Joseph Golian
Attorney, Agent, or Firm—Vogt & O'Donnell

[57] ABSTRACT

Process for extracting roasted and ground coffee characterized in that the coffee, having an average particle size not exceeding 2.0 mm, is wetted in the absence of air with at least twice its weight of an aqueous liquid, and the wetted coffee is transferred, in the absence of air, to an extractor where it is extracted with an aqueous liquid at a temperature of at least 100° C.

8 Claims, No Drawings

PROCESS FOR EXTRACTING ROASTED AND GROUND COFFEE

This invention is concerned with the extraction of roasted and ground coffee.

For a long time the industrial processes for the extraction of coffee have been carried out in batteries of cylindrical extractors having a diameter to height ratio normally between 1:20 and 3:20. It was considered satisfactory for good extraction if the total length of the coffee column extracted was relatively large, initial pressure sufficient and the throughput (favoured by wetting, sufficient packing and filters) was sufficiently high. Different types of wetting were known, depending on whether they were effected before, during or after filling of the coffee into the extraction column. Frequently wetting in the column itself was preferred in order to avoid loss or deterioration of the aroma of the fresh ground coffee.

However, bearing in mind that the quality of the extract improves with diminishing extraction time, it has been proposed to extract thinner beds, for example by the process described in Swiss Patent No. 614104. Nevertheless, although it provides extracts of a very high quality, such a process is costly because the extraction yield does not go beyond about 25%, which barely corresponds to the normal household yield.

The object of the present invention is to provide an extraction process using very finely ground roasted coffee and producing high quality extracts at industrially acceptable yields. According to the invention the process comprises wetting, in the absence of oxygen, roasted and ground coffee having an average particle size not exceeding 2.0 mm, with at least twice its weight of an aqueous liquid, transferring the wetted coffee, out of contact with oxygen, to an extractor and extracting the coffee with an aqueous liquid at a temperature of at least 100° C. Preferably, the coffee particles have an average size of 0.6 to 1.5 mm.

As stated, at least 2 parts of liquid, which may be water or extract, are used per part of fresh roasted coffee. Wetting may be effected in an enclosed screw conveyor which may also convey the moist coffee to the extractor. Wetting may be carried out at ambient temperatures or higher, to about 110° to 120° C. which correspond to the temperatures of cold extractors. If it is intended to drain extract during wetting and before transferring the coffee to the extraction system, 3 to 7.5 parts of liquid (water and/or extract) may be used per part by weight of fresh ground coffee. The temperatures may also be within the range of 20° to 120° C. In this last case, which is a preferred embodiment, it is especially advantageous to have a thin bed of coffee, using a sealed filter such as the one described in the above patent. This may for example be effected by wetting the coffee with 0.5 to 1 part of water at the first station and at subsequent stations follow with extract obtained from the extraction system. The final extract is collected from each of these stations and the coffee saturated with residual liquid is transferred to an extractor where it may be drained if sufficient free liquid is present. A part of the liquid in this mixture may come from the washing of the filter at the recovery station.

In another preferred embodiment of the process, a compacted thin bed of roasted and ground coffee is wetted by passing extract and/or water therethrough. In a preferred variant of the first embodiment the coffee is wetted with 0.5 to 1.3 times its weight of water, whereafter 2 to 6.5 times its weight of a mixture of extract from the extraction system and drained extract is passed, and the final extract is withdrawn in an amount corresponding to 2 to 3 times the weight of the coffee. The coffee grounds and residual free liquid are transferred to an extractor. In this embodiment the qualitative advantages of thin bed extraction are combined with the economics of conventional processing. This combination is obtained in the process according to the invention which permits percolator extraction of coffee which has been very finely ground for thin bed extraction without plugging the extractors.

Preferably, the coffee is extracted at least 3 times in a conventional semi-continuous counter-current system using at least 3 percolators. In this arrangement the extraction liquid passes through successive percolators commencing with that which contains practically completely extracted coffee and ending with the percolator containing wetted coffee. The final extract is withdrawn from the last of these percolators. The lowest temperatures (90°–120° C.) and pressures are encountered in the last percolators whereas the highest pressures are in the first where extraction liquid enters the system at temperatures up to 190° C., for example at pressures corresponding to the pressure of saturated steam at these temperatures. Preferably, the extraction system comprises 3 to 6 percolators. Moreover, at least one further percolator is used which is emptied and filled with wetted coffee whilst the others are on stream. The draw-off ratio (weight ratio of extraction liquid to coffee) may be between 2.5 and 10.0. Relatively high yields may be obtained at the lower end of the range whilst still maintaining product quality.

In the preferred variant involving draining of the percolator after the pumpable mixture of coffee and water and/or extract has been loaded, a first extract may be drawn off corresponding to about 0.5 to 1 part by weight per part by weight of original fresh ground coffee. Preferably, excess liquid is drained off so that the remaining wetted coffee has a density of 0.5 to 1 g per $cm^3$. This first extract may be combined with the extract obtained from the percolator extraction system or be processed separately.

The final extract drawn from the percolator system may contain 3 to 20% by weight of dry matter depending on the draw-off ratio (weight ratio of extraction liquid to coffee) and the selected yield. When the final extract is dried to provide a powdered or granular instant coffee, the present process is operated in such manner that the dry matter content is at the upper end of the range so that the amount of water to be removed during subsequent concentration is not excessive whilst at the same time preserving the high quality of the product. Concentration and drying may be effected by freeze-concentration and freeze-drying or vacuum evaporation and spray drying.

The following examples are given for the purposes of illustrating the process according to the invention. Percentages, proportions and parts are given on a weight basis unless stated otherwise.

The results of comparative testing of extract obtained as described in the examples are summarized at the end of Example 6.

EXAMPLE 1

Roasted ground coffee, having an average particle size of 0.8 mm is wetted in a screw conveyor with 2.7 times its weight of coffee extract at a temperature of 95° C. The extract contains 13.5% dry matter and in continuous operation 240 kg per hour of fresh coffee are fed into the system.

The wetted coffee is transferred to a percolator where 0.7 parts of liquid ("drained extract") are withdrawn per part of coffee used. The extractor is then connected into an extraction system in first position. Extraction liquid from the percolator in second position is at a temperature of 110° C. and contains 10% dry matter. 720 kg of extract are obtained per hour.

The extract is concentrated by evaporation and freeze-dried.

EXAMPLE 2

The procedure described in Example 1 is repeated except that the coffee is wetted with water at 90° C.

EXAMPLE 3

The procedure described in Example 1 is modified in that wetting is effected in the rotary filter described in Swiss Patent No. 614104. An extract containing 5% of dry matter is used, at a temperature of 105° C., and the ratio extract/coffee is 5.7:1.

After wetting, 3 parts of first extract are withdrawn per part of ground coffee and thereafter the coffee is transferred to the percolator. 0.7 parts of extract are then withdrawn and extraction is carried out. The final extract, drawn off at a ratio of 3.7:1 is concentrated and dried.

EXAMPLE 4

As in Example 3 the coffee is wetted in a rotary filter. However, 1.3 parts of water at 100° C. per part of coffee are used in the first stage and 5.4 parts of extract at 110° C. and containing 4.3% dry matter in the second. Before transfer to the percolator 4 parts of extract are withdrawn instead of 3. The rest of the operations is as described in Example 3.

EXAMPLE 5

The procedure is as described in Example 4 except that 6.4 parts of extract (instead of 5.4) are used for wetting and 5 parts of extract are withdrawn.

EXAMPLE 6

The procedure described in Example 3 is used except that 6.7 parts of water at 100° C. are used instead of 5.7 parts of extract, and before transfer to the percolator 4 parts of extract are withdrawn.

Tasting results

Samples of instant coffee prepared according to a conventional method without pre-wetting (I), with prewetting in the percolator (II), according to Examples 1 (III) and 5 (IV), were evaluated by a panel of trained tasters. Their comments are summarized below.

| Sample | Comments |
| --- | --- |
| I | Full, balanced but with artificial acidity, process taste, instant coffee flavour |
| II | Full but with grounds flavour, cereal flavour, baggy taste |
| III | Full, balanced, clean, natural, neutral |
| IV | Full, balanced, aromatic, fresh, |

| Sample | Comments |
| --- | --- |
| | filter coffee flavour |

EXAMPLE 7

The favorable effect of pre-wetting according to the invention on the extractibility of coffee loaded in an extractor is shown as follows:

When the quantity of extract indicated under "Draw-off ratio" has been obtained, core-samples are taken in the centre and at four points (A, B, C, D) disposed symmetrically between the centre and the periphery of a bed of coffee inside the extractor. The quantity of soluble matter extracted at each point is determined and expressed as a percentage of the dry coffee utilised. The following extraction yields were found:

| | |
| --- | --- |
| Centre | 19.8% |
| A | 19.8 |
| B | 18.2 |
| C | 17.6 |
| D | 17.3 |
| Average yield | 18.5 |

Overall variation (maximum less minimum) = 2.5%

The results of a series of trials are summarized below:

| Trial | Draw-off ratio | Average yield | Variation |
| --- | --- | --- | --- |
| 1 | 3.6:1 | 17% | 1.2% |
| 2 | 3.5:1 | 18% | 2.8% |
| 3 | 3.6:1 | 17% | 4.4% |
| 4 | 3.9:1 | 16% | 1.3% |
| 5 | 4.1:1 | 14% | 6.1% |
| 6 | 3.0:1 | 9.2% | 2.5% |
| 7 | 3.9:1 | 16% | 3.7% |
| 8 | 3.6:1 | 2.3% | 25% |
| 9 | 2.8:1 | −3.7% | 28% |

N.B.:
Trials 1, 2: wetting in a screw conveyor
Trials 3–7: wetting in a rotary filter
Trials 8, 9: without wetting; the negative yield (Trial 9) demonstrates that the extraction is irregular

EXAMPLE 8

Roasted and ground coffee, having an average particle size of 1.8 mm, is wetted in a screw conveyor with 2.0 times its weight of a coffee extract at 95° C., containing on average 11.2% of dry matter. In continuous operation, 240 kg of fresh coffee are fed in per hour.

The coffee thus wetted is transferred to an extractor, in the absence of air, using the screw conveyor. The extractor is then connected to an extraction system, in first position, and extraction carried out. The extraction liquid leaving the extractor in second position is at a temperature of 105° C. and contains 8.9% of dry matter. 960 kg of extract are obtained per hour.

The extract is concentrated by evaporation and freeze-dried.

EXAMPLE 9

Roasted and ground coffee, having a particle size of 0.6 mm, is wetted in a rotary filter with an extract containing 3.1% dry matter and with water, at 105° C., the ratios extract:coffee and water:coffee being, respectively, 5.2:1 and 1.2:1. In continuous operation, 240 kg of coffee are fed per hour.

The procedure described in Example 1 is followed; after wetting but before transfer to the extractor 3.9 parts of a first extract, containing 3.1% of dry matter, are withdrawn per part of ground coffee. 0.8 parts of extract containing 6.5% dry matter are then drained and extraction is carried out.

The final extract, withdrawn at a ratio of 4.7:1 (weight of extract:weight of ground coffee) and containing 6.17% of dry matter is concentrated and freeze-dried.

EXAMPLE 10

The procedure described in Example 1 is followed except that the ground coffee has an average particle size of 1.3 mm.

We claim:

1. Process for extracting roasted and ground coffee comprising wetting, in the absence of oxygen, roasted and ground coffee having an average particle size not exceeding 2.0 mm, with at least twice its weight of an aqueous liquid, transferring the wetted coffee, out of contact with oxygen, to an extractor and extracting the coffee with an aqueous liquid at a temperature of at least 100° C.

2. Process according to claim 1 in which the ground coffee has an average particle size between 0.6 and 1.5 mm.

3. Process according to claim 1 or claim 2 in which the coffee is wetted with 3.0 to 7.5 parts by weight of liquid per part of coffee.

4. Process according to claim 1 or claim 2 in which a thin, compacted bed of coffee is wetted by passing at least one of a coffee extract and water therethrough.

5. Process according to claim 1 or claim 2 which comprises wetting a thin, compacted bed of coffee with 0.5 to 1.3 times its weight of water, passing through the coffee bed 2.0 to 6.5 times its weight of coffee extract, recovering an amount of coffee extract corresponding to 2.0 to 5.0 times the weight of coffee and transferring the coffee, with residual liquid, to an extractor.

6. Process according to claim 1 which comprises forming a pumpable mixture of coffee together with at least one of water and coffee extract, feeding the mixture to an extractor, draining excess liquid and extracting soluble matter from the coffee.

7. Process according to claim 6 in which after draining the coffee has a density of 0.5 to 1.0 g/cm$^3$.

8. Process according to claim 7 in which the ground coffee has an average particle size between 0.6 and 1.5 mm.

* * * * *